United States Patent Office 3,024,811
Patented Mar. 13, 1962

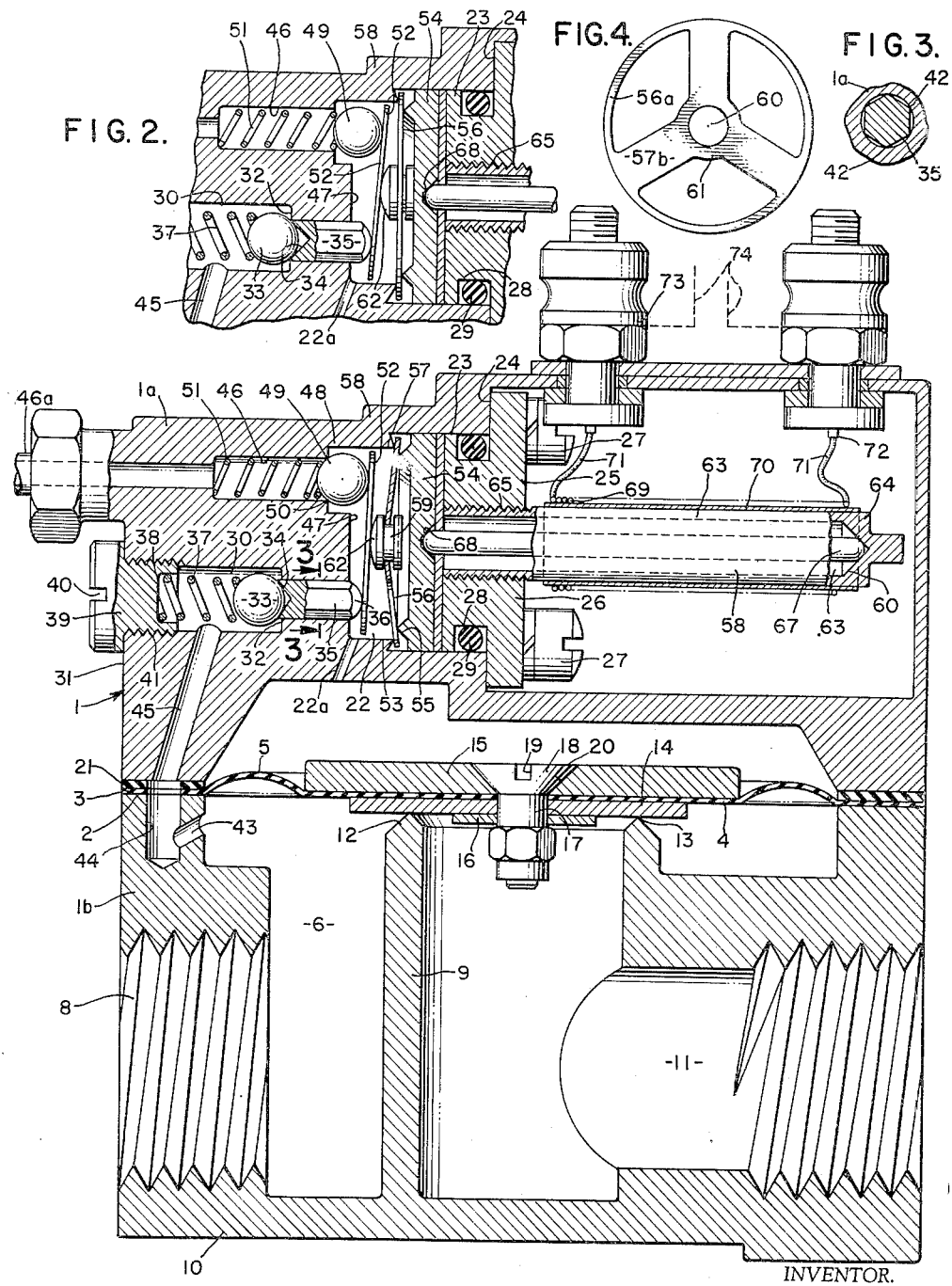

3,024,811
VALVE CONTROL APPARATUS
Edwin W. McKinley, Hemet, Calif., assignor, by mesne assignments, to Controls Company of America, Schiller Park, Ill., a corporation of Delaware
Filed Jan. 26, 1959, Ser. No. 789,127
2 Claims. (Cl. 137—623)

This invention relates to valves, particularly those adapted for controlling the flow of fluids, and is most useful for controlling the flow of fluids, and particularly gaseous fuels to their points of consumption.

The invention is concerned particularly with controlling means for such a valve, that is in its turn controlled by a thermostat, subject to changes of temperature in a confined space, such as those that could occur in auditoriums, conventional halls, or in any other situation where the valve must be opened from its normally closed position, to obtain a desired temperature at a point where the heaters supplied with fuel from the valve, are located.

An object of the invention is to provide a valve for this purpose which is of a type involving the use of a pressure sensitive diaphragm which separates two pressure chambers, and in which the valve and the port through which the fuel flows are normally in closed relation. This relation is preferably established and maintained by relying upon a means employed for maintaining a slight bias of the valve and diaphragm toward the closed position for the valve.

Another object of the invention is to provide a control chamber closely associated in its functioning, with the two pressure chambers for controlling the opening and closing movements of the diaphragm; and one purpose of this control chamber is to provide two valve means for affecting the relative pressures above and below the diaphragm, controlled through the agency of a thermostat placed at some proper point in a chamber or hall, heaters in which are being supplied with fluid fuel from the valve mechanism now being described.

A further object of the invention is to provide means for effecting the opening of the main supply valve when fluid fuel is needed by burners supplied from the same. This control is effected through the agency of two valves, the functioning of which, with respect to each other, is quite unique. The two control valves cooperate with each other through their association with a control chamber where, normally, they are subjected to a restraining pressure exerted upon the two valve members by a thermoelectric controlled thrust device that normally is developing pressure against both of the valves simultaneously.

This mode of operation is such that when the thermoelectric control device is activated through the agency of a circuit leading from the thermostat located in the space being heated, a thrust force which the valves are normally subjected to, will "fade" or be discontinued, so as to enable the valves to cooperate with each other in an active manner to liberate a quantity of the fuel from the control chamber to exhaust, or to the atmosphere, which operation reduces the pressure in the auxiliary pressure chamber above the diaphragm, thereby effecting a reduction in pressure above the valve; and this will result in moving the valve to an open position.

A pressure inlet bleed valve is provided that cooperates with other elements in a control chamber to effect this result. This is characterized by the presence of a movable pin for its valve member which I call the pressure inlet bleed valve member in this combination; in the normal position of this movable pin for the pressure inlet bleed valve member, the pressure inlet valve is at the rear end of this pin and held off its seat to establish the bleed effect to a pressure control chamber. But when a thrust force to which the two control valves are subjected becomes released or relaxed the rear end of the pin shifts forward sufficiently to permit its associated valve member to move forward onto a seat, which completely closes off flow through the pressure inlet bleed valve; and with this same shifting action the release is effected of the pressure in the control chamber and the exhausting, and reduction of pressure in auxiliary or upper, chamber of the pressure controlled valve.

It is a fact that there are many valve control devices, and some of them include a part known popularly as a "snap-over" disc, but such combinations that employ the "snap-over" disc are open to certain objections; hence, one of the objects of the present invention is to provide a reliable organization of parts that will effect the relative reduction in pressure in the auxiliary chamber to insure that the main valve will open without fail. When the circuit to this control valve mechanism activates the thermoelectric device to release the two small control valves, they function immediately to reduce the pressure in the auxiliary pressure chamber.

Further objects of the invention will be evident from a careful reading of this specification and study of the drawing accompanying it.

The invention consists of novel parts and combinations of parts to be described hereinafter; all of which contribute to produce a valve control apparatus.

A preferred embodiment of the invention is described in the following specification, while the broad scope of the invention is pointed out in the appended claims.

In the drawing:

FIGURE 1 is a vertical section through a casing which operates as a housing for all the parts that cooperate within this casing in practicing the instant invention. These parts in FIGURE 1 are all shown in their position of rest, in which they lie when the main valve is in its closed position, as shown in this view. Furthermore, in this view, some of the working parts are shown partially in elevation and partially in cross-section.

FIGURE 2 is a fragmentary view. It is also a vertical section through the control chamber and the parts cooperating with the same in performing their functions, but showing these parts in the relation they have after the thermoelectric device has completed its function to free the two control valve members, that is, the pressure inlet bleed valve member to permit it to reach its seat including relaxing its thrust upon the forward end of the movable pin, and also showing the outlet pressure bleed valve member moved off of its seat to open the outlet from this valve to exhaust or to atmosphere, from the interior of the control chamber; in the relation shown in this view the main valve will be caused to open and to perform its intended function.

FIGURE 3 is a fragmentary view, and is a vertical cross-section on the section line 3—3 of FIGURE 1, through the pin member. This view is added to disclose more clearly how the pin functions as a bleeder port to the control chamber from the inlet bleeder valve chamber that contains the inlet pressure bleeder valve.

FIGURE 4 is a side view of a pressure head or thrust head, which normally maintains the pressure upon the inlet pressure bleeder valve member and the outlet pressure bleeder member to maintain them in their normal or "set" position of rest as shown in FIGURE 1.

Referring particularly to the parts of the apparatus, it is preferable to provide a casing 1, which is a casting comprising an upper portion or bonnet 1a and a lower portion 1b. The lower body portion is provided with two faces 2, on which are seated the edge or margin 3 of a diaphragm 4, the material of which presents a peripheral zone 5, which operates as the portion of the diaphragm that can bulge in an upward direction or a downward direction, in accordance with the relation of the pressures existing at the moment in a main pressure chamber, 6 below it, and an auxiliary chamber 7 above it.

The base portion 1b of the casing also is provided with a threaded inlet opening 8 which in the present instance, admits the fluid against the side of a substantially tubular abutment 9, the bottom portion of which is integral with a base plate 10 of this piece of the casting. At the opposite side of this peripheral wall, it connects to a threaded outlet 11, and the upper end of the substantially tubular abutment 9 presents a valve seat 12 which, as illustrated, presents a circumferential dihedral angle popularly referred to as a "knife edge" 13.

Against the underside of the diaphragm 4, a valve member 14 composed of any desired material such as a suitable plastic may be cemented. This part is preferably slightly compressible; and in order to bias the valve towards its seat a disc 15 of a certain weight is secured by cement, or other means to the diaphragm. The diameter of this weight determines, of course, the distance of bulge of the excess material at 5.

The diameter and consequently the weight of disc 15 may be changed as desired, depending on the specification of the mechanism, and the prevailing pressure at which the fluid fuel is to be furnished through the inlet opening 8. A metal washer 16 is applied to the underside of the valve member 14, and the diaphragm valve and this washer 16 have registering perforations to receive the body of a bolt 17 that fastens down from above to connect these parts together. As illustrated, this bolt preferably has a large conical head 18 with a screw driver slot 19. The conical head seats in a conical counterbore 20 the lower end of which is about in line with the underside of the weight.

On the upper face of the margin portion 3 of the diaphragm 4, a gasket 21 is provided, and bolts (not illustrated) are provided to clamp the bonnet portion 1a forcibly down onto the base portion 1b of the casing.

The bonnet portion of the casing at about midway of its length is provided with a control chamber 22, which constitutes the forward portion of a relatively large bore 23 that is cut into a vertical face 24 that receives the forward portion 25 of a head 26, and this head 26 is secured to the vertical face 24 by a plurality of bolts, the heads 27 of two bolts being visible in FIGURE 1.

The reduced forward portion 25 of the head 26 has a relatively large circumferential groove 28 that is provided with an O-ring 29 that operates as a tight seal for the outer end of the bore 23.

In the material of the bonnet 1a which lies to the left of the control chamber 22 as viewed in FIGURE 1, an inlet pressure bleeder valve chamber 30 is provided in the form of a bore that extends into the extreme left face 31 of the bonnet. Just forward of the forward end of the inlet pressure bleeder valve chamber 30 a guide bore 31 is provided of smaller diameter than the chamber 30. The left end of this bore 31 where it emerges into the chamber 30 provides an annular seat 32 for an inlet pressure bleeder valve which is preferably in the form of a steel ball 33, the function of which will be presently described.

The side of this ball valve 33 that is toward the control chamber 22, as shown in FIGURE 1, seats against a conical face 34, to center the ball, which is cut into the rear of a movable valve operating pin 35 that is hexagonal in cross section and is movable in the guide bore 31. The forward end of this pin has a rounded tip 36 that projects into the control chamber. It will be noted that the conical socket formed at the other end of the pin 35 projects into the chamber 30 so as to hold the valve 33 normally out of contact with the seat 32 at the rear end of the guide bore. Ball valve 33 is provided with resilient means for biasing it against pin 35 and to the right towards its seat 32. The resilient means may be in the form of a relatively strong coil spring 37.

The left end of this spring seats in a centering socket 38 cut into the inner face of a threaded plug 39 with a screw-driver slot 40 for tightening the same into place, on threads 41 cut into the outer end of the bored chamber 30.

A detail of the pin 35 is illustrated in FIGURE 3 which indicates that the cross-section of this pin is actually a hexagon, the peripheral dihedral angles 42 of which are located far enough from the axis of the pin, to enable them to fit neatly into the guide bore 31.

As shown in FIGURE 1, a bleeder passage, or duct connection from the interior of the main pressure chamber 6 is provided up to the valve chamber 30, and this connection includes a short drilled port 43 that is located at a point on the left hand vertical wall of the base 1b of the casing. This short port tips downwardly toward a vertical drilled passage 44, the upper portion of which passes up through the margin 3 of the diaphragm 4, and through the gasket 21 above it to connect through a third drilled passage 45, the upper end of which passes through the bottom wall of inlet pressure bleed chamber 30.

In addition to the inlet pressure bleed valve chamber 30, an outlet pressure bleed valve chamber 46 is cut into a vertical face 47 and has an eccentrically located counterbore 48, the presence of which develops desirable clearance for valve 49, which is also preferably of ball type. Valve chamber 46 is vented to atmosphere by means of vent 46a.

In this connection, it should be stated that the seat 50 for this valve is formed by the intersecting bore 46 where it passes into the transverse face of the counterbore at 48.

This outlet pressure bleeder valve 49 is also biased off its seat toward the right, that is to say, toward the interior of the control chamber 22. This is accomplished by means of a relatively weak resilient means, which in this case, is also preferably a coil spring 51, which spring is relatively weak as compared with the inlet pressure bleeder valve spring 37.

In accordance with my invention, both of these valves 33 and 49 are normally in the position shown in FIGURE 1, by reason of the presence of a lever-means 52 which is preferably in the form of a thin but stiff discs which fits neatly into a bore 53 that forms a portion of the circumferential wall of the control chamber 22. This lever means 52, as illustrated in FIGURE 1, is shown disposed in a slightly inclined plane from the vertical. It floats in the bore and bridges the short space between the two valves 49 and 33. The valve chambers of these valves have axes transversely to the vertical wall 47 of the control chamber 22 and they are parallel to each other.

In order to develop a thrust force to hold the lever means 52 firmly against the valve 49 and the pin 35, a presser assembly is employed which as illustrated, includes a presser head 54 movably mounted in the bore 23. It is provided on its inner face toward chamber 22 with a circumferential contact rib 55, that preferably has a "knife edge" tip thrusting against the edge portion of a resilient contact plate 56.

In cooperation with the contact rib 55 a similar but reactive effect is developed by providing a similarly shaped rib 57 which projects its "knife edge" inwardly from the inner face of the wall 58 of the casing 1a, to contact with the forward face of the resilient contact plate 56. This plate normally has the dished form in which it is illustrated in FIGURE 1, but when the pressure normally exerted by rib 55 is removed by operation of the thermo electric motor, the plate will assume the flat form as shown in FIG. 2.

When the plate 56 is in its dished or warped form, a double rimmed button 59 carried at an opening 60 in its nave 61 presses its rounded nose, or tip 62 against the lever-means 52.

As stated heretofore, the lever-means should be stiff enough so as not to flex excessively under the pressure exerted by the button 59, though it will be evident that by reason of the character of the mounting for this plate 56 the movement at the center of the plate is greatly increased as compared with the small relative movement of the contact rib 55 with respect to the fixed rib 57.

The valves 33 and 49 that are associated together with the control chamber 22 are activated by means of the thermoelectric device 58 which includes a tube 63 composed of a material having a relatively high coefficient of expansion. This tube may be of fine grade steel and has an integral head 64 on its rear end that carries threads 65 at its forward end and which is mounted by this means into the sealed head 25.

This rear head has a conical seat 66 on its inner side on which is centered a steel rod 67, the forward end of which has a rounded tip that fits into a conical socket 68 in the rear face of the presser head 54. This device has an activating coil 69 of resistance wire that is wrapped on an insulating sleeve 70 that is slipped over the tube.

Electric current is brought to this coil through the two insulating leads 71 attached to terminals 72 at the lower ends of two large binding posts that are connected to leads 74 indicated diagrammatically in dotted lines which connect to two conductors that are in a circuit 74 that is normally maintained open at the thermostat.

Normally the fine steel tube 63 will be in its most contracted position by reason of the fact that it is not being heated by the electric current.

If the temperature in the space to be heated, such as a hall or room, drops below a critical temperature, it will automatically close the circuit. This will cause the steel tube to lengthen which will occasion a movement towards the right of the head 64, as viewed in FIGURE 1. This will enable the resilient contact plate 56 to resume its flat form (see FIGURE 2), thereby relieving the thrust of the button 59 against the lever means 52 permitting it to move bodily to the right, then the spring 37 will come into action and move the movable pin 35 towards the right, projecting it further into the chamber 22 and permitting the ball valve 33 to seat itself on the secondary seat 32.

Movement of the head 64 to the right also frees the valve 49 from any thrust pressure against it by the lever means 52; and also permits the lever 52 to lie supinely in the chamber 22 in an inclined position such as is shown in FIGURE 2. In this position ball valve 49 will be lifted off its seat by spring 51 thus venting chamber 7 to atmosphere through duct 22a, control chamber 22 and bore 46.

Referring again to FIGURE 4, it will be noted that the contact plate 56 may be made of skeleton type with a rim 56a and radial blades or spokes 57b connecting its nave 61 to the skeleton type rim.

When the desired temperature is attained in the vicinity of the thermostat the switch controlled by it will open and when the thermoelectric device cools down the rod 67 will contract and resume its thrust against the presser head 54 and the contact plate will be pushed into its dished form and resume its thrust against the lever means 52. This will first close the valve 49 and then push the movable pin 35 back to its normal position, with ball valve 33 open and the bleeder ports on the side of the hex functioning again as a bleeder duct through which fluid from chamber 6 flows to build up pressure in chamber 7.

Many other embodiments may be resorted to without departing from the spirit of this invention.

I claim as my invention and desire to secure by Letters Patent:

1. Control means for a pressure operated valve including a body portion having a relatively large bore, a smaller bore concentric with the large bore, parallel inlet and outlet bleeder valve bores parallel to and on either side of the axis of the large bore, ball valves in each of the bleeder valve bores, a spring urging the outlet ball valve off its seat toward the large bore, a stronger spring urging the inlet ball valve onto its seat toward the large bore, a valve operating pin contacting the inlet ball valve and extending into the smaller bore, a lever disc loosely mounted in the smaller bore in contact with the outlet ball valve and the inlet ball valve operating pin, a pressure head slidably mounted in the large bore, a resilient circular contact plate mounted in the large bore, an annular knife edge at the periphery of the smaller bore contacting one side of the contact plate at its periphery, a second annular knife edge on the pressure head contacting the other side of the contact plate inwardly of its periphery, means centrally of the contact plate for engaging the lever disc and means for moving the pressure head axially of the large bore to sequentially open and close the ball valves.

2. Control means for a pressure operated valve including a body portion having a relatively large bore, a smaller bore concentric with the large bore, parallel inlet and outlet bleeder valve bores parallel to and on either side of the axis of the large bore, ball valves in each of the bleeder valve bores, a spring urging the outlet ball valve off its seat toward the large bore, a stronger spring urging the inlet ball valve onto its seat toward the large bore, a valve operating pin contacting the inlet ball valve and extending into the smaller bore, a lever disc loosely mounted in the smaller bore in contact with the outlet ball valve and the inlet ball valve operating pin, a pressure head slidably mounted in the large bore, a resilient circular contact plate mounted in the large bore, an annular knife edge at the periphery of the smaller bore contacting one side of the contact plate at its periphery, a second annular knife edge on the pressure head contacting the other side of the contact plate inwardly of its periphery, means centrally of the contact plate for engaging the lever disc, a head mounted in the end of the large bore to form a gas tight closure, a tube having a closed end and a threaded open end, a threaded opening in the center of the head to receive the tube, an electrical resistance coil surrounding the tube to heat the same and a rod connecting the closed end of the tube with the pressure head to move it axially of the large base to sequentially open and close the ball valves.

References Cited in the file of this patent
UNITED STATES PATENTS

| | | |
|---|---|---|
| 1,611,961 | Thompson | Dec. 28, 1926 |
| 2,200,187 | Nelson | May 7, 1940 |
| 2,232,934 | Baak | Feb. 25, 1941 |
| 2,236,908 | Jackson | Apr. 1, 1941 |
| 2,349,484 | Converse | May 23, 1944 |
| 2,461,615 | Taylor | Feb. 15, 1949 |
| 2,473,038 | Rockwell | June 14, 1949 |
| 2,498,121 | Haberland | Feb. 21, 1950 |
| 2,656,983 | Grayson | Oct. 27, 1953 |
| 2,710,162 | Snoddy | June 7, 1955 |